US009235625B2

(12) United States Patent
Lewis et al.

(10) Patent No.: US 9,235,625 B2
(45) Date of Patent: Jan. 12, 2016

(54) RANKING MEDIA CONTENT SOURCES

(71) Applicant: GOOGLE INC., Mountain View, CA (US)

(72) Inventors: Justin Lewis, Marina Del Rey, CA (US); Benoît de Boursetty, Santa Monica, CA (US)

(73) Assignee: GOOGLE INC., Mountain View, CA (US)

( * ) Notice: Subject to any disclaimer, the term of this patent is extended or adjusted under 35 U.S.C. 154(b) by 109 days.

(21) Appl. No.: 13/776,368

(22) Filed: Feb. 25, 2013

(65) Prior Publication Data

US 2014/0244660 A1    Aug. 28, 2014

(51) Int. Cl.
*G06F 17/30* (2006.01)

(52) U.S. Cl.
CPC ...... *G06F 17/3053* (2013.01); *G06F 17/30864* (2013.01)

(58) Field of Classification Search
USPC ......................................................... 707/748
See application file for complete search history.

(56) References Cited

U.S. PATENT DOCUMENTS

| 7,774,335 | B1 * | 8/2010 | Scofield et al. ............... 707/709 |
| 7,797,421 | B1 * | 9/2010 | Scofield et al. ............... 709/224 |
| 7,958,127 | B2 * | 6/2011 | Edmonds et al. ............. 707/748 |
| 8,122,017 | B1 * | 2/2012 | Sung et al. .................... 707/723 |
| 8,311,883 | B2 * | 11/2012 | Crane-Baker .......... G06Q 10/00 705/14.4 |
| 2003/0001873 | A1 * | 1/2003 | Garfield ............ G06F 17/30014 715/700 |
| 2005/0165780 | A1 * | 7/2005 | Omega ................ G06F 17/3071 |
| 2006/0200445 | A1 * | 9/2006 | Chen .................. G06Q 30/0185 |
| 2006/0294085 | A1 * | 12/2006 | Rose et al. ........................ 707/3 |
| 2007/0208583 | A1 * | 9/2007 | Ward ................................. 705/1 |
| 2009/0006398 | A1 * | 1/2009 | Lam et al. ......................... 707/7 |
| 2009/0216742 | A1 | 8/2009 | Coffman et al. |
| 2012/0233154 | A1 | 9/2012 | Walther et al. |
| 2014/0236923 | A1 * | 8/2014 | Catledge ....................... 707/722 |

OTHER PUBLICATIONS

International Searching Authority, "Notification of Transmittal of the International Search Report and the Written Opinion of the International Search Authority, or the Declaration," for International Application No. PCT/US2014/018417, mailed Nov. 11, 2014, 9 pages.

* cited by examiner

*Primary Examiner* — Cam-Linh Nguyen
(74) *Attorney, Agent, or Firm* — Lowenstein Sandler LLP

(57) ABSTRACT

A processing device identifies a plurality of media items that have been accessed by a user. The processing device determines a plurality of annotations in the plurality of media items that identify a plurality of media content sources. The processing device calculates scores for the plurality of media content sources, wherein a score for a media content source of the plurality of media content sources is calculated based at least in part on a quantity of the plurality of annotations that identify the media content source. The processing device ranks the plurality of media content sources based on the calculated scores. The processing device the provides one or more ranked media content sources for presentation to the user.

23 Claims, 6 Drawing Sheets

RANKING MEDIA CONTENT SOURCES

TECHNICAL FIELD

The present disclosure generally relates to media content sources such as video channels, social network profiles, data feeds, etc., and more specifically to ranking such media content sources.

BACKGROUND

Multiple different types of media content sources are available online. Media content sources are sources of media items such as videos, text strings, and so forth. Users can subscribe to particular media content sources and then receive media items from those media content sources. One example of a media content source is a video channel, such as provided by a video hosting service. Another example of a media content source is a user profile of a social network service. Yet another example of a media content source is a data feed such as a twitter feed provided by a social network service. Due to a vast quantity of available media content sources, it may be difficult for users to find and subscribe to media content sources that interest them.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In an implementation of the present disclosure, a processing device identifies multiple media items that meet a criterion. The media items may be those that have been accessed by a user or those pertaining to a particular subject, for example. The processing device determines annotations in the media items that identify media content sources. The processing device calculates scores for the media content sources. A score is calculated for a media content source based at least in part on how many annotations identify the media content source. The processing device ranks the media content sources based on the calculated scores. The processing device then provides one or more ranked media content sources for presentation to the user.

In addition, methods and systems for performing the operations of the above described implementations are also implemented. Further, a computer readable storage medium is provided to store instructions for performing the operations of the above described implementations.

In one implementation a system includes means for identifying a plurality of media items that satisfy a criterion. The system further includes means for determining a plurality of annotations in the plurality of media items that identify a plurality of media content sources. The system further includes means for calculating scores for the plurality of media content sources, wherein a score for a media content source of the plurality of media content sources is calculated based at least in part on a quantity of the plurality of annotations that identify the media content source. The system further includes means for ranking the plurality of media content sources based on the calculated scores. The system further includes means for providing one or more ranked media content sources for presentation to a user.

The system may additionally include means for determining a plurality of descriptions of the plurality of media items that identify the plurality of media content sources, wherein the score for the media content source is calculated based on the quantity of the plurality of annotations that identify the media content source and a quantity of the plurality of descriptions that identify the media content source. Additionally or alternatively, the system may include means for determining a plurality of comments to the plurality of media items that identify the plurality of media content sources, wherein the score for the media content source is calculated based on the quantity of the plurality of annotations that identify the media content source and a quantity of the plurality of comments that identify the media content source. Additionally, the system may include means for determining a plurality of additional annotations in the plurality of media items identifying external sources that reference the plurality of media content sources, wherein the score for the media content source is calculated based on the quantity of the plurality of annotations and a quantity of the plurality of additional annotations.

BRIEF DESCRIPTION OF THE DRAWINGS

The present disclosure will be understood more fully from the detailed description given below and from the accompanying drawings of various implementations of the disclosure.

DETAILED DESCRIPTION

Figure 1:
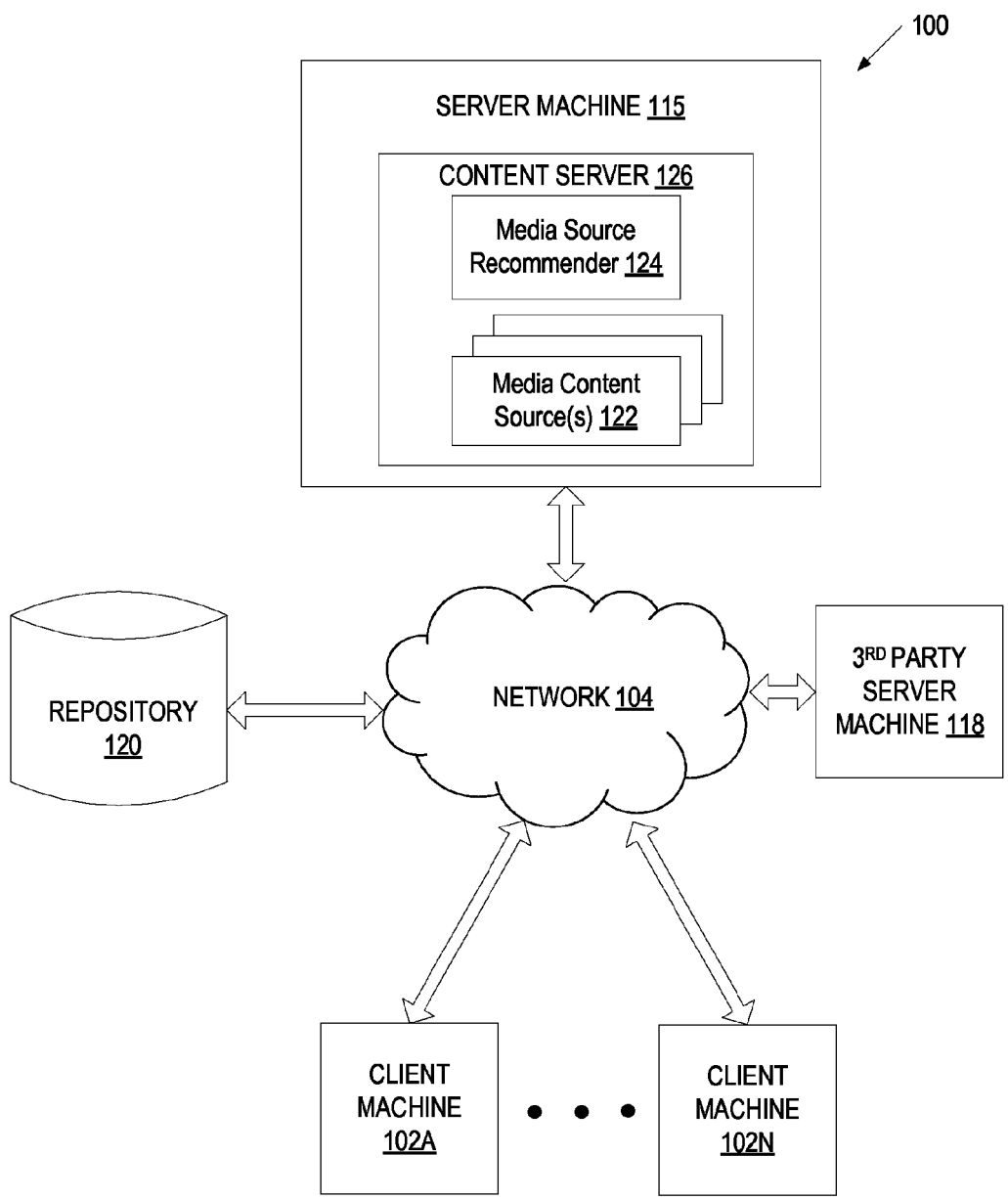
FIG. 1 illustrates an exemplary system architecture, in accordance with one implementation of the present disclosure.

Described herein are a system and method for ranking media content sources and suggesting media content sources to users for subscription and/or consumption. Users can subscribe to particular media content sources and then receive media items from those media content sources. Multiple different online or web-based services offer many media content sources for subscription and/or consumption. For example, a video hosting service can offer a multitude of channels, with each channel providing a collection of videos. A video channel may include videos sharing common metadata (e.g., artist, genre, title, etc.), videos uploaded by the same user and/or videos in a user-created playlist. Each channel may be a media content source. The videos in a channel are typically uploaded or selected by a particular entity (e.g., a user that curates the channel). Channels may be dedicated to particular subjects or may have particular themes. Examples of channels include comedy channels, music video channels, gaming channels, automotive channels, sports channels, and so forth. Channels can also be associated with a particular entity (e.g., a particular user), without being dedicated to any specific topic. Users that subscribe to a channel may receive videos from that channel for viewing.

In another example, a social networking service can include millions of profiles, which include user profiles as well as profiles of entities such as businesses. Each profile may be a media content source. A profile provides updates about a user or entity as the user or entity posts those updates. Updates may include music, videos, text, images, and whatever else the user has decided to post. Other users can subscribe to (or "follow") a particular profile, after which the subscribing user will receive updates when new posts are added to the profile subscribed to.

In another example, a social networking and microblogging service can millions of different accounts. Each account may be a media content source. Users can subscribe to (or "follow") other accounts, after which the subscribing user receives text-based messages of up to 140 characters as those messages are posted by the account subscribed to. Such messages are commonly referred to as "tweets."

In each of the above examples, a particular service provider provides hundreds to millions of disparate media content sources. It can be an arduous task for users to filter through the multitude of media content sources to identify and select media content sources that those users might be interested in. Embodiments of the present invention provide a system that ranks media content sources for a user to enable the user to more easily find and subscribe to media content sources of interest.

Note that some implementations of the present disclosure are discussed with reference to videos and/or channels that provide videos. Such videos may be digital videos, and may be encoded in numerous different formats, such as the Windows Media®, Real Media®, Audio Video Standard (AVS), Theora®, VP8, WebM, VC-1, Quicktime®, MPEG-4 (also known as MP4), Flash®, MPEG-2, DivX®, audio video interlace (AVI), or advanced video coding (AVC) video file formats. Though some implementations may be discussed with reference to videos and channels, implementations of the present disclosure also apply to other digital media items such as images, text strings, audio files and so forth. Additionally, implementations apply to media content sources other than channels, such as social network profiles, feeds, accounts, and so forth. Examples of audio files to which implementations of the present disclosure may apply include digital music and other audio clips such as moving picture experts group (MPEG) audio layer 3 (MP3) files, advanced audio coding (AAC) files, waveform audio file format (WAV) files, audio interchange file format (AIFF) files, Apple® Lossless (m4A) files, etc. Examples of image files to which the implementations of the present disclosure may apply include joint photographic experts group (JPEG) files, portable network graphics (PNG) files, bitmap image (BMP) files, graphics interchange format (GIF) files, and so forth.

FIG. 1 illustrates an example system architecture 100, in accordance with one implementation of the present disclosure. The system architecture 100 includes a server machine 115, a repository 120 and client machines 102A-102N connected to a network 104. The system architecture 100 may also include a third party server machine 118 connected to the network 104. Network 104 may be a public network (e.g., the Internet), a private network (e.g., a local area network (LAN) or wide area network (WAN)), a cellular network, a broadcast network, or a combination thereof.

The client machines 102A-102N may be personal computers (PCs), laptops, mobile phones, tablet computers, set top boxes, televisions, video game consoles, digital assistants or any other computing devices. The client machines 102A-102N may run an operating system (not shown) that manages hardware and software of the client machines 102A-102N. A browser (not shown) may execute on some client machines (e.g., on the OS of the client machines). The browser may be a web browser that can access content served by a content server 126 by navigating to web pages of the content server 126 (e.g., using the hypertext transport protocol (HTTP)). The browser may issue queries and commands to the content server 126, such as commands to access a specific video, commands to share a video, commands to optimize the video, and so forth.

Some client machines 102A-102N include applications that are associated with a service provided by content server 126. Examples of client machines that may use such applications ("apps") include mobile phones, "smart" televisions, tablet computers, and so forth. The applications or apps may access content provided by content server 126, issue commands to content server 126, receive content from content server 126, and so on without visiting web pages of content server 126.

Via an app or a browser, the client machines 102A-102N may subscribe to one or more media content sources 122 provided by content server 126. The app or browser of the client machine 102A-102N may then receive media items associated with the subscribed media content sources 122. Additionally, the client machines 102A-102N may also upload media items to the content server 126 for storage in a repository 120 via the app or browser.

Server machine 115 may be a rackmount server, a router computer, a personal computer, a portable digital assistant, a mobile phone, a laptop computer, a tablet computer, a netbook, a desktop computer, a media center, or any combination of the above. Server machine 115 includes content server 126 that serves media items from repository 120 to client machines 102A-102N. Content server 126 may include a multitude of media content sources 122 and a media source recommender 124 that ranks media content sources 122 for users and recommends media content sources 122 to the users based on the ranking. The nature of the media content sources 122 may depend on the content server 126. For example, if content server 126 is a video hosting service, then media content sources 122 may be channels for videos. In another example, if content server 126 is a social networking service, then media content sources 122 may be user or entity profiles or accounts. Media source recommender 124 is described in greater detail below with reference to FIG. 2.

In general, functions described in one embodiment as being performed by the content server 126 can also be performed on the client machines 102A-102N in other embodiments if appropriate. In addition, the functionality attributed to a particular component can be performed by different or multiple components operating together. The content server 126 can also be accessed as a service provided to other systems or devices through appropriate application programming interfaces, and thus is not limited to use in websites.

Repository 120 is a persistent storage that is capable of storing media items such as video files, text strings, images, audio files, and so forth. As will be appreciated by those skilled in the art, in some implementations repository 120 might be a network-attached file server, while in other implementations repository 120 might be some other type of persistent storage such as an object-oriented database, a relational database, and so forth, that may be hosted by the server machine 115 or one or more different machines coupled to the server machine 115 via the network 104. The media items stored in the repository 120 may include user generated content that is uploaded by client machines 102A-102N. The media items may additionally or alternatively include content provided by other entities (e.g., service providers such as news organizations, publishers, libraries and so on). Media items may or may not be associated with particular media content sources 122.

Content server 126 may receive media items from client machines (also referred to herein as clients) 102A-102N and/or a third party server machine 118, and store those media items in repository 120. Uploaded media items may be associated with particular media content sources 122 (e.g., an account or channel of an entity that uploaded the media items). New media items and/or an identification of the new media items may be sent to those client machines 102A-102N that have subscribed to these media content sources 122. Client machines 102A-102N may subsequently request to consume (e.g., play or view) these media items. If the media items were not already transmitted to the requesting client machines 102A-102N, then content server 126 may send the media items to these client machines 102A-102N from repository 120.

In the example of videos, content server 126 may stream selected videos of a media content source 122 to clients 102A-102N, or may download the videos to the clients 102A-102N. In streaming, the clients 102A-102N can begin playback of the video before receiving the entire video. In contrast, with downloading the video typically is not playable until a complete file is received by the client 102A-102N.

Figure 2:
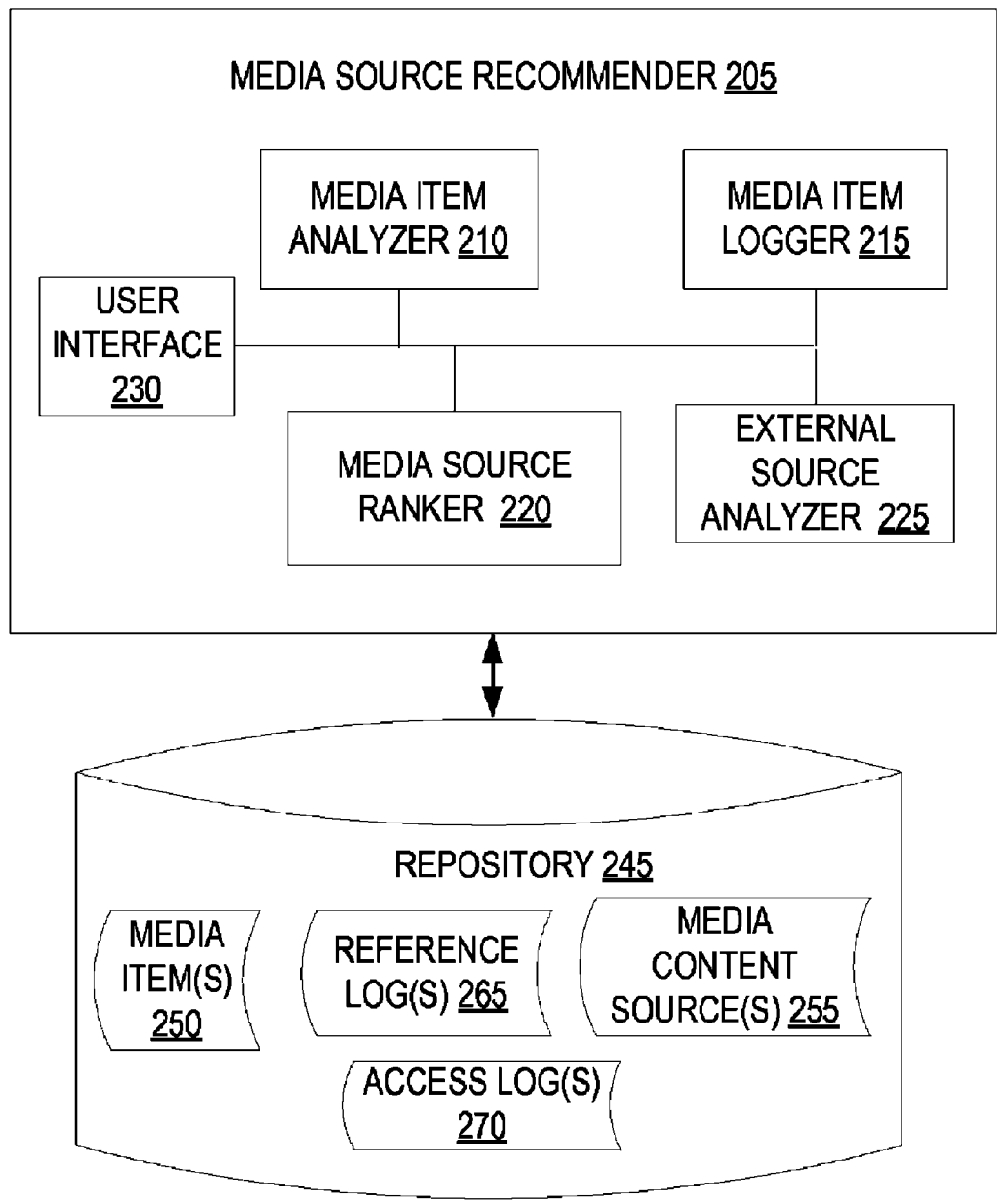
FIG. 2 is a block diagram of a media source recommender, in accordance with one implementation of the present disclosure.

FIG. 2 is a block diagram of a media source recommender 205, in accordance with one implementation of the present disclosure. The media source recommender 205 may include a user interface 230, a media item analyzer 210, a media item logger 215, a media source ranker 220 and/or an external source analyzer 225. Note that in alternative implementations, the functionality of one or more of the user interface 230, media item analyzer 210, media item logger 215, media source ranker 220 and/or external source analyzer 225 may be combined into a single module or divided into multiple modules. In one implementation, media source recommender 205 corresponds to media source recommender 124 of FIG. 1.

Media source recommender 205 may be coupled to a repository 245, which may store media items 250, reference logs 265, media content sources 255 and/or access logs 270. Alternatively, different types of data may be stored in different repositories. For example, access logs 270 and reference logs 265 may be stored in a separate repository than media items 250 and media content sources 255. In one embodiment, the repository 245 stores a record of all users who have registered an account with a content server. Each registered account includes at least a user name and e-mail address associated with the account. A registered account may also include information about the user associated with the account such as their name, hobbies, uploaded videos, favorite videos, and/or playlists of videos created by the users. Such information may be used to adjust weighting applied to references by media items to media content sources.

In situations in which the systems discussed here collect personal information about users, or may make use of personal information, the users may be provided with an opportunity to control whether programs or features collect user information (e.g., information about a user's actions or activities, user's preferences, etc.), or to control whether and/or how to receive content from the content server that may be more relevant to the user. In addition, certain data may be treated in one or more ways before it is stored or used, so that personally identifiable information can be determined for the user. Thus, the user may have control over how much information is collected about the user and used by a content server.

Media item logger 215 may monitor the media items accessed by a user. For each user, media item logger 215 may determine the user's interactions with media items and populate an access log 270 with information on such interactions. The user may be logged into an account of the user, in which case the user interactions may be associated with a particular user. Accordingly, media items accessed over multiple sessions may be logged. Alternatively, the user may be an anonymous user, which may not have a user account. In such an example, media item logger 215 may log those media items accessed by the user during a single session in an access log 270.

Users may be subscribed to one or more media content sources. In one implementation, media item logger 215 monitors media content sources to which a user is subscribed and adds entries to the access logs 270 for media items provided by these media content sources. Accordingly, in such an implementation an access log may include entries both for media items actually accessed by a user as well as entries for media items provided by media content sources to which the user subscribes.

Each entry in the access log 270 may identify a media item, whether the media item was accessed (or was unaccessed, but was provided by a media content source that a user is subscribed to), a time of access, a device identifier (ID) if available, data identifying the type of interaction with the media item, and so forth. Interaction types can include any user interaction, such as playing, saving, rating, sharing, pausing, rewinding, viewing, commenting, and forwarding a media item.

Media items 250 may include annotations, descriptions and comments (described more fully below). These annotations, descriptions and comments may reference media content sources and/or media items associated with media content sources. Media item logger 215 may identify rates of activation (e.g., click through rates) of the annotations in the media items, as well as click through rates of references to media content sources and media items in comments and descriptions. Such click through rates and rates of activation may be stored in access logs 270 or in separate logs.

Media item analyzer 210 analyzes media items. Media item analyzer 210 may perform an initial analysis to determine which media items satisfy one or more scoring criteria. One possible scoring criterion is a user access criterion that is satisfied if a media item was accessed by a particular user (e.g., a user for which a media content source recommendation is to be made). If the user access criterion is used, then media content sources may be scored and ranked based on references to those media content sources from media items accessed by the user.

Another scoring criterion is a user interest criterion that is satisfied if a media item has been accessed by other users who have also accessed media items accessed by a particular user. Media item analyzer 210 may compare the access logs 270 of different users. When another user who has accessed a threshold amount of the same media items accessed by the particular user in question is identified, media item analyzer 215 may determine what additional media items have been accessed by that other user. Media item analyzer 210 may analyze those additional media items for references to media content sources, and media source ranker 220 may include data on those references in the calculation of the media content source ranking. Additionally, media item analyzer 210 may determine subjects or categories of media items accessed by a particular user. Media item analyzer 210 may then identify other media items that are of the same category as satisfying the user interest criterion. Media item analyzer may then analyze those identified media items.

Another scoring criterion is a subject criterion. A media item satisfies a subject criterion if the media item relates to a particular subject. Such a relation to a subject may be determined based on metadata of the media item such as tags. In an example, if comedy media content sources are to be ranked, then media items identified as comedy media items may satisfy the subject criterion.

Another scoring criterion is a subscription criterion. A media item satisfies the subscription criterion if the media item was provided by a media content source to which a user is subscribed. If the subscription criterion is used, then media content sources may be scored and ranked based on references to those media content sources from media items provided by other media content sources to which the user is subscribed.

In some implementations, no scoring criteria may be used or multiple scoring criteria may be used. If no scoring criteria are used, then all media items may be selected for analysis. If multiple scoring criteria are used, then media items satisfying any of the multiple scoring criteria may be selected for further analysis. Alternatively, those media items satisfying all of the used scoring criteria may be used.

Once media items are selected for further analysis, media item analyzer 210 analyzes those media items to identify media content sources. Media items may include multiple different types of references to media content sources. Such references may be included in annotations embedded in the media items, in user comments associated with the media items, in descriptions of the media items and/or in other metadata associated with the media items.

Media items such as videos may include annotations that have been inserted into the video at a particular point. For example, an annotation may be inserted 3 minutes into a 5 minute video. When the 3 minute point is reached during playback of the video, an object (e.g., a button and/or or popup) may be displayed in accordance with the annotation. One type of annotation that may be inserted into a media item is a call-to-action annotation. A call-to-action annotation may be a button that invites a user to press the button, thus activating the annotation and initiating an action. Such an action may be directing that user to a media item (e.g., a video) or a media content source (e.g., a channel). The object may be present during some or all of the video (e.g., for 2:12 to 5:00), and may be present at a particular region of a display. In one implementation, the call to action annotation may be clicked by a user to open a new web page.

If annotations are identified, media item analyzer 210 may further analyze the annotation to determine whether it is associated with or references any particular media content source. For example, an annotation may redirect a user to a particular media content source (e.g., a video channel) or to a video or other media item associated with a media content source. Media item analyzer 210 may identify and record such associations to media content sources.

Metadata such as a description of a media item may include a reference to one or more media content sources and/or to media items that are associated with the media content sources. For example, a description of a video on a particular topic may include a recommendation to visit or subscribe to a particular media content source on that topic. Media item analyzer 210 may analyze the descriptions of media items to identify such references to media content sources and/or media items. When such references are identified, media item analyzer 210 may record the identify of the referenced media content sources and/or media content sources associated with the reference media items.

Users may add their own comments to media items. For example, users that like a media item may post a comment to that effect. Some comments of users may include recommendations to other media items and/or to media content sources. For example, a user commenting on a video may state that they also really enjoyed another particular video. Media item analyzer 210 may analyze the comments for a media item to identify any references to other media items or to media content sources. Media item analyzer 210 may then determine media content sources associated with referenced media items, and may record the identity of the media content sources.

Media item analyzer 210 may analyze all of the media items 250 that satisfy a scoring criterion (e.g., all media items accessed by a user in one implementation). Media item analyzer may keep a record of all media content sources referenced in those media items 250. In one implementation, media item analyzer 210 maintains one or more reference logs 265, each of which may be a list, tabulation, or other data structure of identified media content sources. The reference logs 265 may include a separate entry for each identified media content source. Each entry may include a count of the number of references that have been made to that media content source or to media items that are associated with the media content source. The references may be divided based on reference source in one implementation. For example, separate counts may be maintained for a number of annotations having references to a media content source, a number of descriptions having references to a media content source, a number of comments that have references to a media content source, and so on.

Additionally, media item analyzer 210 may identify any links or references to external sources (e.g., to external websites such as blogs, social media sites, news sites, etc.) that are included in or associated with media items that satisfy a scoring criterion. External source analyzer 225 may analyze those external sources to determine whether those external sources include references to any media content sources and/or media items associated with media content sources. For example, external source analyzer 225 may scrape a web site referenced in a feed to find any other feeds mentioned in the referenced web site. The identities of any such referenced media content sources may be recorded by external source analyzer 225. For example, external source analyzer 225 may add the external references to media content sources to reference logs 265.

Media source ranker 220 ranks media content sources for a user based on the analysis performed by media item analyzer 210 and/or external source analyzer 225. To rank the media content sources, media source ranker 220 may compute scores for those media content sources to be ranked. In one implementation, media source ranker 220 computes scores for media content sources based on entries in reference logs 265. In a basic implementation, media source ranker 220 may add up a number of references to a media content source (e.g., a number of references from annotations, descriptions and/or comments), and this value may be the score for that media content source.

In further implementations, media source ranker 220 may determine a contribution of individual references to the media content source, and then add up these contributions to compute the score for that media content source. Media source ranker 220 may weight the contribution of a particular reference based on multiple different criteria, such as reference source (e.g., whether the reference was from an annotation, a description or a comment), whether the reference was direct or indirect (e.g., whether the reference was an indirect reference from a referenced external source), how long ago the media item including the reference was accessed, which scoring criterion was satisfied by the media item associated with the reference (e.g., whether the media item was accessed by a user, provided by a media content source to which the user subscribes, accessed by other users, etc.) and so forth. For example, references from media items accessed by a user may be assigned a higher contribution than references from media items provided by media content sources to which the user subscribes. A contribution of a reference to the score may also depend on a click through rate or other activity measure for that reference. For example, an annotation may provide a greater contribution to the score if that annotation was activated by numerous users than if that annotation was not activated.

If the scoring criterion used is a user access criterion, then user interest in particular media items may be used to weight contributions of references to the score for a media content source. For example, the contribution of a reference may be increased if the user has indicated that he or she has a particular interest in a media item including the reference. This may be indicated by the user posting a positive comment about the media item, the user accessing the media item multiple times, the user sharing the media item, and so on.

In some instances, no scoring criterion is used to filter media items. In one implementation, an entire corpus of media items may be evaluated, regardless of whether any particular user has accessed those media items. If media content source scoring is being performed for a particular user, then media score ranker 220 may apply a higher weight to those media content sources that were referenced from media items accessed by the user. For example, in one implementation media source ranker 220 applies a weight of 1 to references to a media content source by media items accessed by the user, a weight of 0.5 to references to a media content source by media items provided by another media content source to which the user is subscribed, and a weight of 0.2 to references to the media content source by media items not accessed by the user and not provided by any media content source to which the user is subscribed. Typically there will be many more media items that have not been accessed by a user than have been accessed by the user. Accordingly, the scale of the applied weights may be shifted, so that the weight applied to a reference from an un-accessed media item is a fraction of that applied to a reference from an accessed media item. For example, a weight of 0.001 may be applied to a reference from a media item that was not accessed by the user.

Once scores have been computed for multiple media content sources, media source ranker 220 ranks the media content sources 255 based on their scores. Media content sources having higher scores may be more likely to be of interest to a user, whereas media content sources having lower scores may be less likely to be of interest to the user. Accordingly, media content sources 255 having the highest scores may be ranked ahead of media content sources 255 having lower ranks.

User interface 230 may provide ranked media content sources 255 for recommendation and display to a user. In one implementation, those media content sources 255 having highest ranks are displayed to a user. For example, the highest ranked 3, 5 or 10 media content sources may be displayed to a user. The user may also be provided with an option to view additional media content sources with lower rankings (e.g., by pressing a "show more" button). The user may select a recommended media content source to sample media items associated with that media content source. User selection of a recommended media content source may cause, for example, clips from representative media items to be presented to the user. If the user determines that he or she likes the sampled media items of a media content source, the user may subscribe to the media content source 255 via the user interface 230 (e.g., by pressing a subscribe button).

User interface 230 may recommend media content sources to users in multiple different views. In one implementation, ranked media content sources are recommended to a user as part of a new user signup flow. In another implementation, ranked media content sources are recommended to a user for particular categories or subjects.

Figure 3:
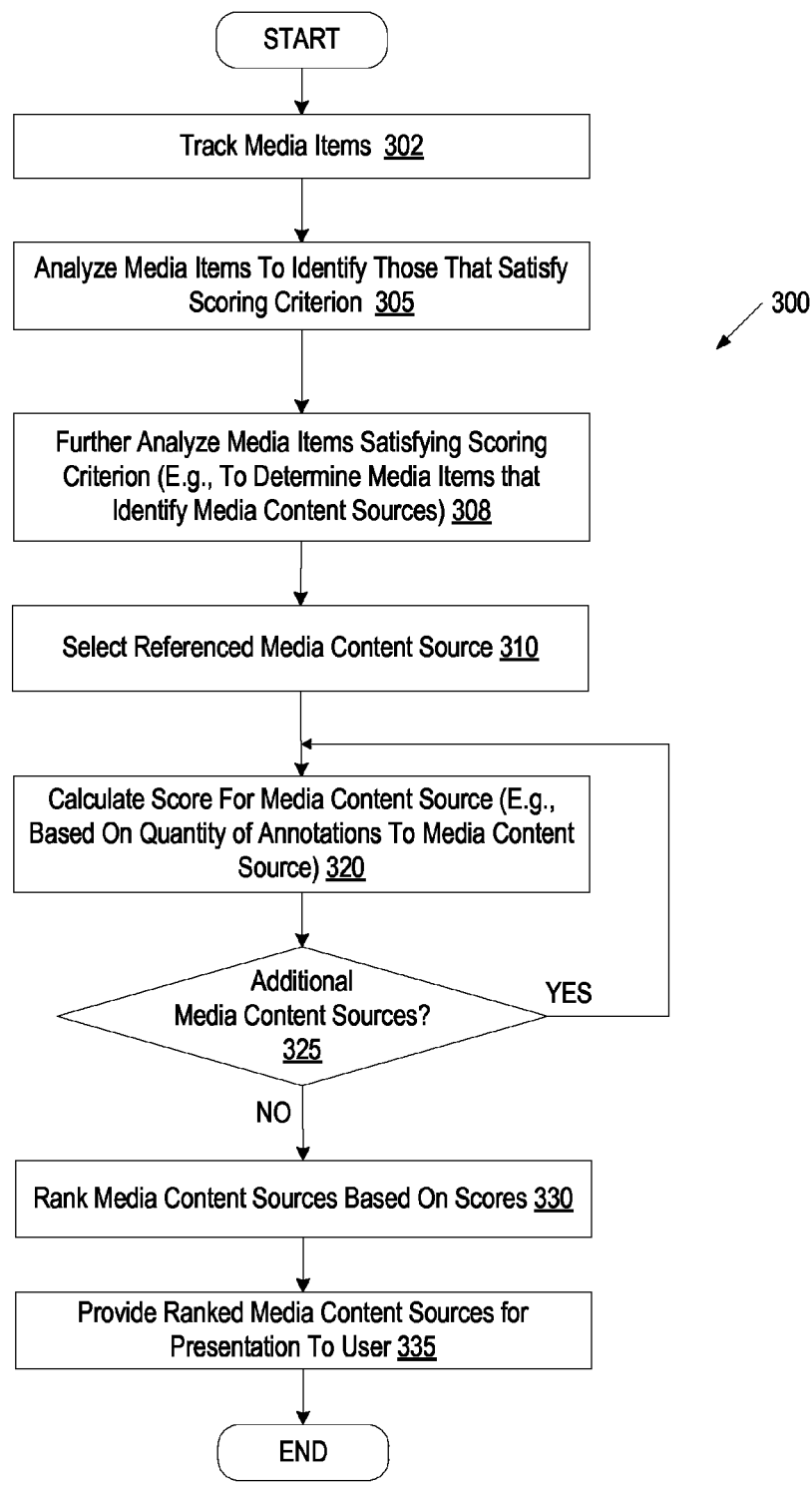
FIG. 3 is a flow diagram illustrating one implementation for a method of ranking media content sources.
Figure 4:
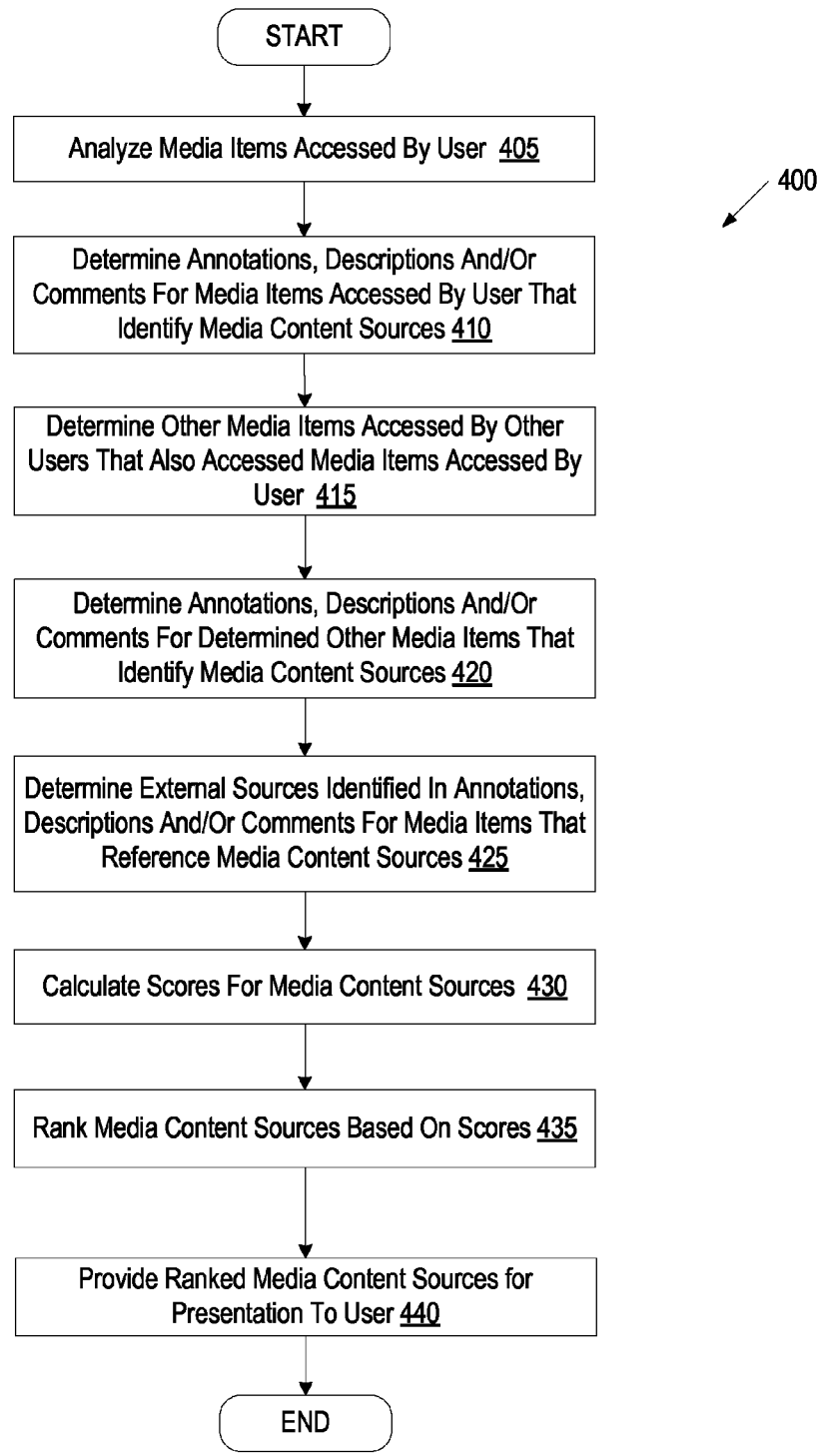
FIG. 4 is a flow diagram illustrating another implementation for a method of ranking media content sources.
Figure 5:
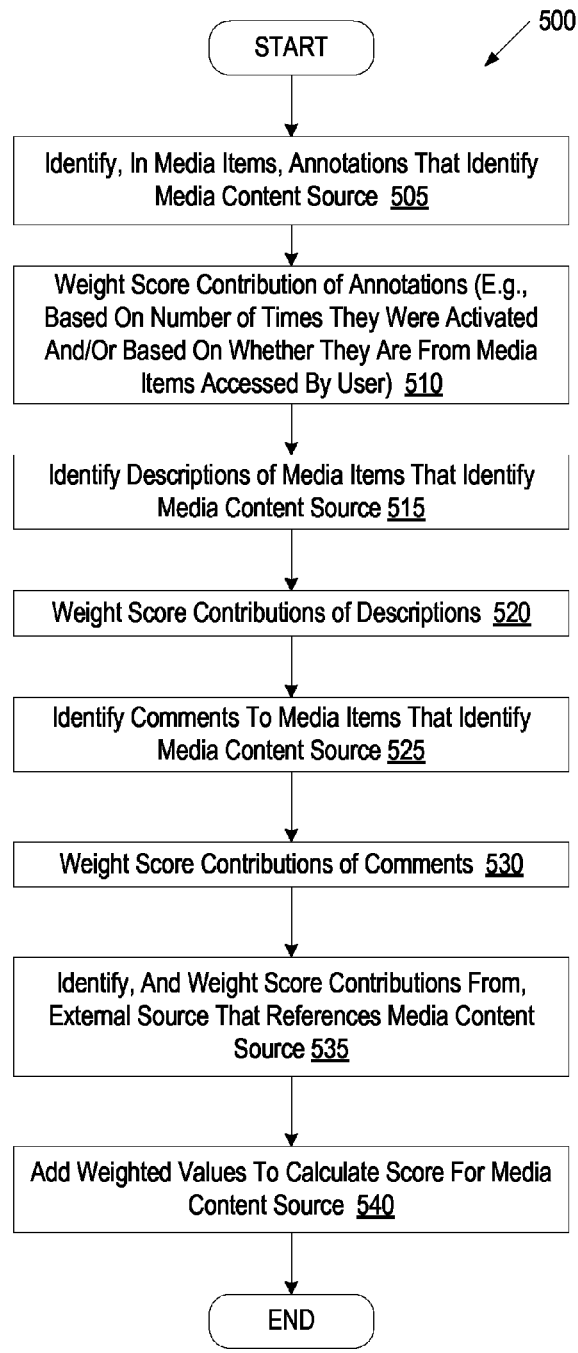
FIG. 5 is a flow diagram illustrating one implementation for a method of scoring media content sources.

FIGS. 3-5 are flow diagrams of various implementations of methods related to ranking media content sources. The methods are performed by processing logic that may include hardware (circuitry, dedicated logic, etc.), software (such as is run on a general purpose computer system or a dedicated machine), or a combination of both. In one implementation, the methods are performed by the server machine 115 of FIG. 1. The methods may be performed, for example, by media source recommender 124 executing on server machine 115 or another machine.

For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

FIG. 3 is a flow diagram illustrating one implementation for a method 300 of ranking media content sources. At block 302 of method 300, processing logic logs media items accessed by one or more users. Processing logic may also track media items provided by media content sources to which users subscribe. Processing logic may track other media items as well. The media items may be videos, text strings, posts from social network accounts, images, and so forth. Processing logic may add entries to an access log for users as the users access the media items. Logged accesses may include user views of the media item, user comments on the media item, user shares of the media item, and so forth. Processing logic may also add entries to an access log (or another log) as those media items are provided by media content sources.

At block 305, processing logic analyzes media items in a corpus of media items to identify those media items that satisfy a scoring criterion (e.g., those media items that have been accessed by a particular user, those media items provided by a media content source to which the user subscribes, etc.).

At block 308, processing logic analyzes the accessed media items to identify references to media content sources. Such analysis may include performing an analysis of annotations included in the media item, an analysis of the media item's description, an analysis of comments made to the media item, and so forth. Such analysis may additionally include identifying external sources (e.g., external websites)

referenced in the media item, and then analyzing those external sources to identify references to media content sources. A result of the analysis of the media items may be identification of one or more references made to multiple different media content sources.

At block 310, processing logic selects a media content source that was referenced by at least one tracked media item satisfying the scoring criterion. At block 320, processing logic calculates a score for the media content source based on a number of references to that media content source from the tracked media items satisfying the scoring criterion. In one embodiment, the score is calculated based, at least in part, on a quantity of annotations to the media content source. At block 325, processing logic determines whether there are any additional media content sources that have been referenced by tracked media items satisfying the scoring criterion. If so, the method returns to block 320, and a score is calculated for another media content source. If scores have been generated for all media content sources referenced by media items satisfying the scoring criterion, the method continues to block 330.

At block 330, processing logic ranks the media content sources based on their scores. The media content sources may be ranked in descending order based on the scores. At block 335, processing logic provides the ranked media content sources for presentation to a user. Those media content sources having highest ranks may be presented to a user (e.g. as subscription recommendations).

FIG. 4 is a flow diagram illustrating another implementation for a method 400 of ranking media content sources. At block 405 of method 400, processing logic analyzes media items accessed by a user. At block 410, processing logic determines references (e.g., annotations, descriptions and/or comments) from media items accessed by the user that identify media content sources based on the analysis. At block 415, processing logic determines other media items accessed by other users that also accessed media items accessed by the user. At block 420, processing logic determines references (e.g., annotations, descriptions, comments, etc.) from those media items to media content sources.

At block 425 processing logic determines external sources identified in the references of the media items accessed by the user. Processing logic may then analyze those external sources (e.g., by scraping external websites) to find any references to media content sources.

At block 430, processing logic calculates scores for the media content sources. The score for a media content source may be calculated based on a quantity of references that were made to that media content source. The references may be from media items accessed by the user, from other media items accessed by other users, and/or from external sources.

At block 435, processing logic ranks the media content sources based on their scores. At block 440, processing logic provides the ranked media content sources for presentation to the user.

FIG. 5 is a flow diagram illustrating one implementation for a method 500 of scoring a media content source. At block 505 of method 500, processing logic identifies annotations in media items that identify the media content source. The media items may have been accessed by a user for which the score is being computed and/or may have been accessed by other users. At block 510, processing logic weights a contribution to the score of each of the annotations that referenced the media content source. A weight applied for an annotation may be based on whether the media item was accessed by the user for which the score is computed. For example, references from media items accessed by the user may be assigned a weight of 1, references from media items accessed by other users who also accessed media items that were accessed by the user may be assigned a weight of 0.5, and references from other media items may be assigned a weight of 0.1 in one example. Applied weights may also be based on other factors, such as the number of times that an annotation was activated, an amount of time that has passed since the media item that includes the annotation was accessed by the user, and so forth.

At block 515, processing logic identifies descriptions of media items that identify the media content source. At block 520, processing logic applies weights to score contributions of the descriptions.

At block 525, processing logic identifies comments to media items that identify the media content source. At block 530, processing logic weights the score contributions of the identified comments.

At block 535, processing logic identifies external sources that reference the media content source. The identified external sources may be sources that were referenced by media items accessed by the user.

At block 540, processing logic adds the weighted values of the contributions from the annotations, descriptions, comments, external sources, etc. to calculate a score for the media content source. Method 500 may be performed for each media content source referenced by a media item satisfying a scoring criterion.

Figure 6:
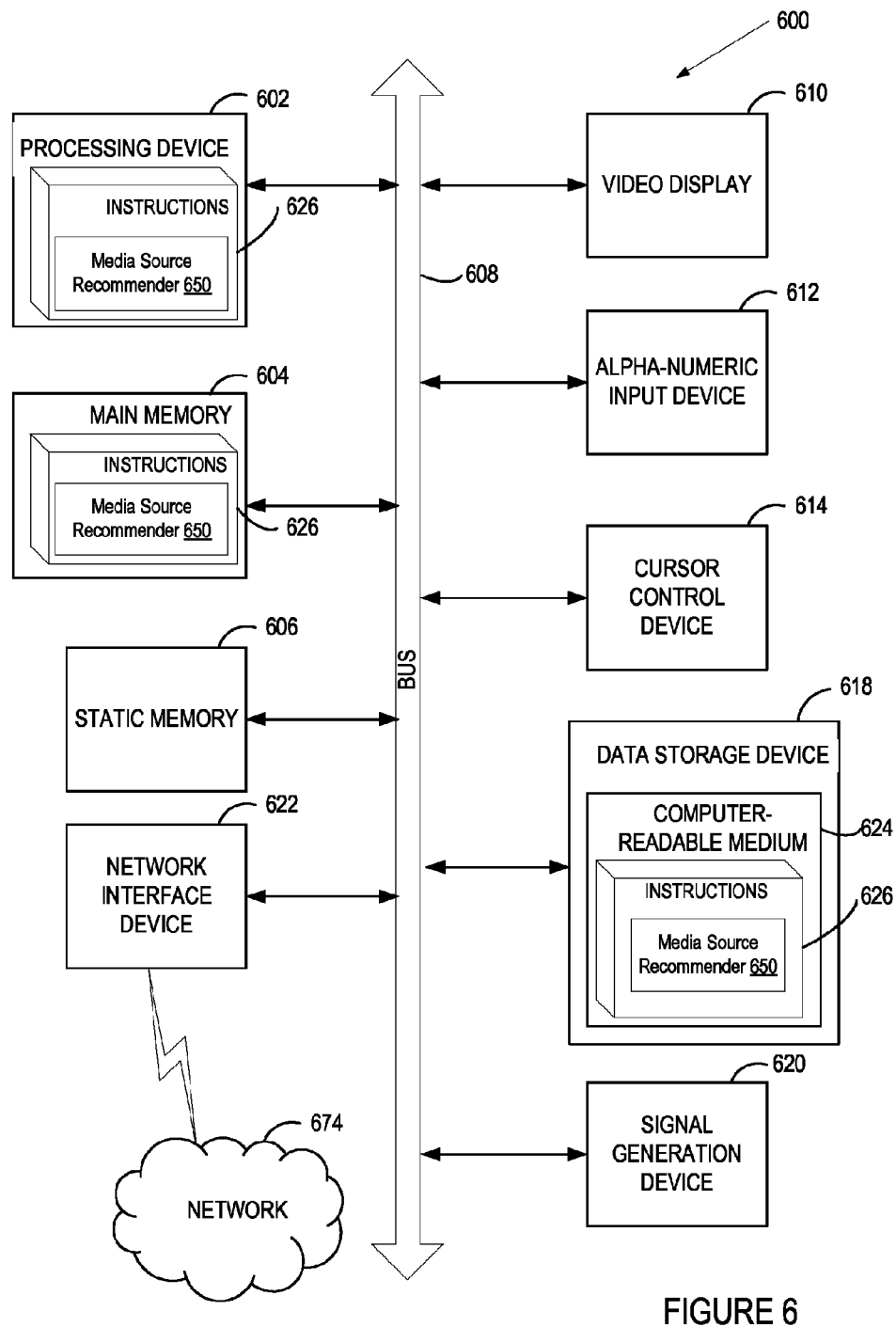
FIG. 6 is a block diagram of an exemplary computer system that may perform one or more of the operations described herein.

FIG. 6 illustrates a diagrammatic representation of a machine in the exemplary form of a computing device 600 within which a set of instructions, for causing the machine to perform any one or more of the methodologies discussed herein, may be executed. In some implementations, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a television, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computing device 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 608.

Processing device 602 represents one or more general-purpose processors such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 602 may also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein.

The computing device 600 may further include a network interface device 622. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The data storage device 618 may include a computer-readable medium 624 on which is stored one or more sets of instructions 626 (e.g., software) embodying any one or more of the methodologies or functions described herein. The instructions 626 may also reside, completely or at least partially, within the main memory 604 and/or within the processing device 602 during execution thereof by the computer system 600, the main memory 604 and the processing device 602 also constituting computer-readable media.

In one implementation, the instructions 626 include instructions for a media source recommender 650, which may correspond to media source recommender 205 of FIG. 2, and/or a software library containing methods that call a media source recommender. While the computer-readable medium 624 is shown in an exemplary implementation to be a single medium, the term "computer-readable medium" should be taken to include a single medium or multiple media (e.g., a centralized or distributed database, and/or associated caches and servers) that store the one or more sets of instructions. The term "computer-readable storage medium" shall also be taken to include any medium that is capable of storing a set of instructions for execution by the machine and that cause the machine to perform any one or more of the methodologies of the present disclosure. The terms "computer-readable medium" and "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "analyzing", "ranking", "determining", "enabling", "identifying," "calculating" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   identifying a plurality of media items that satisfy a criterion, each of the plurality of media items being provided by one of a plurality of media sources;
   determining, by a processing device, a plurality of annotations in the plurality of media items, the plurality of annotations identifying the plurality of media content sources;
   calculating, by the processing device, scores for the plurality of media content sources, wherein a score for a media content source of the plurality of media content sources is calculated based at least in part on a quantity of the plurality of annotations that identify the media content source, and a number of times each of the plurality of annotations that identify the media content source is activated;
   ranking, by the processing device, the plurality of media content sources based on the calculated scores; and providing one or more ranked media content sources for presentation to a user.

2. The method of claim 1, further comprising:
determining a plurality of descriptions of the plurality of media items that identify the plurality of media content sources, wherein the score for the media content source is calculated based on the quantity of the plurality of annotations that identify the media content source and a quantity of the plurality of descriptions that identify the media content source.

3. The method of claim 1, further comprising:
determining a plurality of comments to the plurality of media items that identify the plurality of media content sources, wherein the score for the media content source is calculated based on the quantity of the plurality of annotations that identify the media content source and a quantity of the plurality of comments that identify the media content source.

4. The method of claim 1, wherein the plurality of annotations comprise call-to-action annotations, and wherein a call-to-action annotation provides an object in a media item that, when activated, initiates an action.

5. The method of claim 1, wherein an annotation of the plurality of annotations that identifies a media content source comprises at least one of a reference to the media content source or a reference to a media item provided by the media content source.

6. The method of claim 1, wherein calculating the score for the media content source further comprises:
for each annotation of the plurality of annotations that identifies the media content source, determining a number of times that the annotation was activated and weighting a contribution of that annotation to the score for the media content source based on the number of times that the annotation was activated.

7. The method of claim 1, further comprising:
determining a plurality of additional annotations in the plurality of media items identifying external sources that reference the plurality of media content sources, wherein the score for the media content source is calculated based on the quantity of the plurality of annotations and a quantity of the plurality of additional annotations.

8. The method of claim 1, wherein the criterion is a user access criterion that is satisfied by media items that have been accessed by the user.

9. The method of claim 1, wherein the criterion is a subject criterion that is satisfied by media items associated with a particular subject.

10. The method of claim 1, wherein providing the one or more ranked media content sources for presentation to the user comprises providing a subset of the plurality of media content sources having highest ranks for presentation to the user.

11. A computer readable storage medium having instructions that, when executed by a processing device, cause the processing device to perform operations comprising:
identifying a plurality of media items that satisfy a criterion, each of the plurality of media items being provided by one of a plurality of media sources;
determining a plurality of annotations in the plurality of media items, the plurality of annotations identifying the plurality of media content sources;
calculating scores for the plurality of media content sources, wherein a score for a media content source of the plurality of media content sources is calculated based at least in part on a quantity of the plurality of annotations that identify the media content source, and a number of times each of the plurality of annotations that identify the media content source is activated;
ranking the plurality of media content sources based on the calculated scores; and
providing one or more ranked media content sources for presentation to a user.

12. The computer readable storage medium of claim 11, the operations further comprising:
determining a plurality of descriptions of the plurality of media items that identify the plurality of media content sources, wherein the score for the media content source is calculated based on the quantity of the plurality of annotations that identify the media content source and a quantity of the plurality of descriptions that identify the media content source.

13. The computer readable storage medium of claim 11, the operations further comprising:
determining a plurality of comments to the plurality of media items that identify the plurality of media content sources, wherein the score for the media content source is calculated based on the quantity of the plurality of annotations that identify the media content source and a quantity of the plurality of comments that identify the media content source.

14. The computer readable storage medium of claim 11, wherein the plurality of annotations comprise call-to-action annotations, and wherein a call-to-action annotation provides an object in a media item that, when activated, initiates an action.

15. The computer readable storage medium of claim 11, wherein an annotation of the plurality of annotations that identifies a media content source comprises at least one of a reference to the media content source or a reference to a media item provided by the media content source.

16. The computer readable storage medium of claim 11, wherein calculating the score for the media content source further comprises:
for each annotation of the plurality of annotations that identifies the media content source, determining a number of times that the annotation was activated and weighting a contribution of that annotation to the score for the media content source based on the number of times that the annotation was activated.

17. The computer readable storage medium of claim 11, the operations further comprising:
determining a plurality of additional annotations in the plurality of media items identifying external sources that reference the plurality of media content sources, wherein the score for the media content source is calculated based on the quantity of the plurality of annotations and a quantity of the plurality of additional annotations.

18. The computer readable storage medium of claim 11, wherein the criterion is a user access criterion that is satisfied by media items that have been accessed by the user.

19. The computer readable storage medium of claim 11, wherein the criterion is a subject criterion that is satisfied by media items associated with a particular subject.

20. A computing device comprising:
a memory; and
a processing device coupled to the memory, the processing device to:
identify a plurality of media items that have been accessed by a user, each of the plurality of media items being provided by one of a plurality of media sources;

determine a plurality of annotations, descriptions and comments in the plurality of media items, the plurality of annotations identifying the plurality of media content sources;

calculate scores for the plurality of media content sources, wherein a score for a media content source of the plurality of media content sources is calculated based at least in part on a quantity of the plurality of annotations, a quantity of the plurality of comments, a quantity of the plurality of descriptions that identify the media content source, and a number of times each of the plurality of annotations that identify the media content source is activated;

rank the plurality of media content sources based on the calculated scores; and provide one or more ranked media content sources for presentation to the user.

21. The computing device of claim 20, wherein the plurality of annotations comprise call-to-action annotations, and wherein a call-to-action annotation provides an object in a media item that, when activated, initiates an action.

22. The computing device of claim 20, wherein an annotation of the plurality of annotations that identifies a media content source comprises at least one of a reference to the media content source or a reference to a media item provided by the media content source.

23. The computing device of claim 20, wherein calculating the score for the media content source further comprises:

for each annotation of the plurality of annotations that identifies the media content source, determining a number of times that the annotation was activated and weighting a contribution of that annotation to the score for the media content source based on the number of times that the annotation was activated.

* * * * *